June 15, 1937.  E. R. EVANS  2,083,945
APPARATUS FOR INDICATING VELOCITY
Filed May 26, 1931   2 Sheets-Sheet 1
Fig. 1
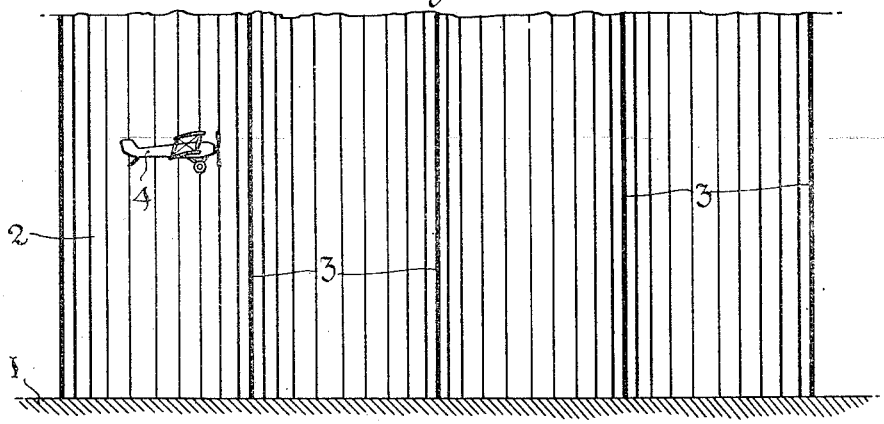
Fig. 2
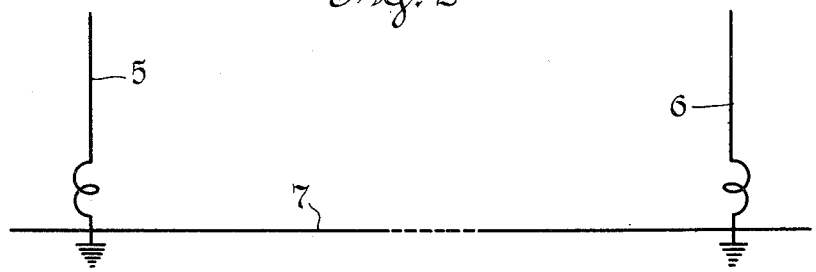
Fig. 3
Fig. 4
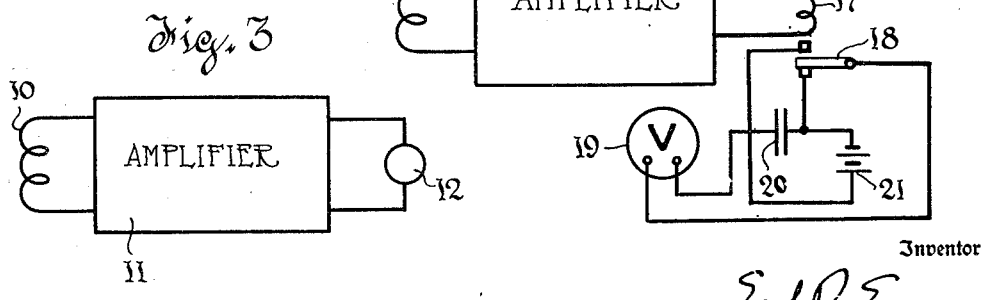
Inventor
Earl R. Evans

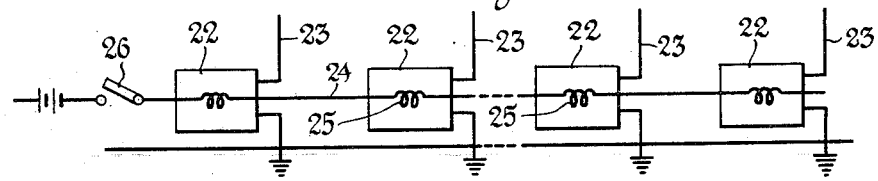
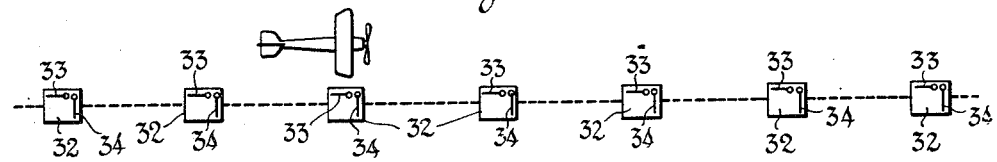
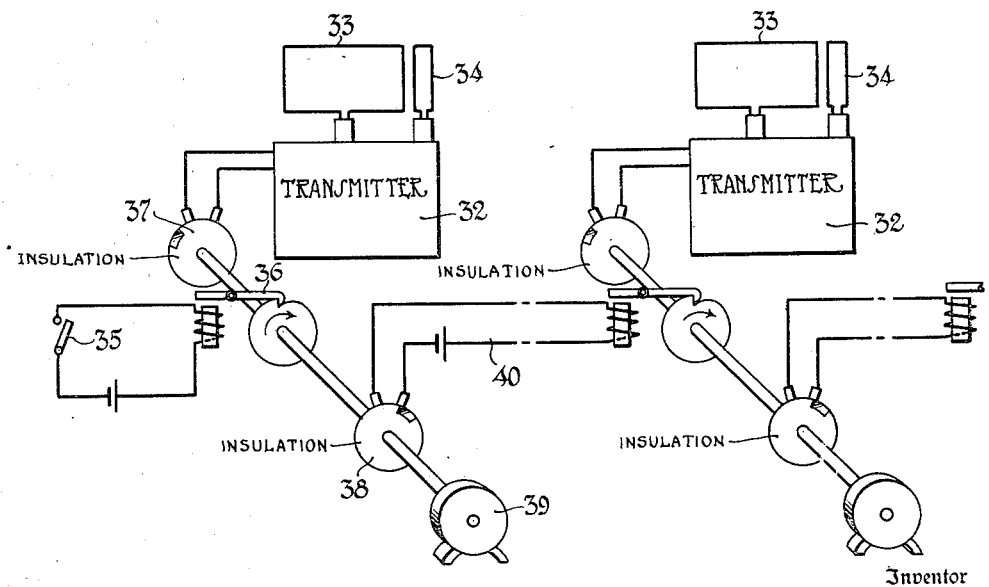

Patented June 15, 1937

2,083,945

UNITED STATES PATENT OFFICE 2,083,945

APPARATUS FOR INDICATING VELOCITY

Earl R. Evans, Washington, D. C., assignor to George L. De Mott, Washington, D. C.

Application May 26, 1931, Serial No. 540,152

6 Claims. (Cl. 250—2)

My invention relates to methods and apparatus for measuring or indicating the velocity of moving vehicles or other objects, and particularly to a method of and apparatus for indicating upon aircraft the actual "ground-speed" thereof or the velocity of the craft relative to a fixed point upon the surface of the ground.

At the present time reliance is placed by the pilot of aircraft almost entirely upon "air-speed" indicating apparatus in estimating the velocity of aircraft. Inasmuch as the velocity of the air impinging upon aircraft in flight has usually no direct relation to the actual "ground-speed" of the aircraft, the use of such apparatus is attended with many difficulties and sometimes leads to delays and accidents. Therefore it is believed that suitable means for indicating actual or true "ground-speed" which is operative even at night or under conditions of low visibility is a practical necessity for safe and economical navigation of aircraft. While optical methods for obtaining approximate "ground-speed" have been devised, such methods are of no practical value as they are complicated and fail entirely when most needed; i. e., at high altitudes or when visibility is poor, as in cloudy or foggy weather or at night.

In accordance with my invention, an electromagnetic field is produced by radiant-energy transmitting apparatus, which is variable in the direction of travel of the aircraft, for example parallel to the surface of the ground, and which is stationary with respect to the ground or which moves at a relatively low velocity such as a velocity of the same order as the maximum velocity of the aircraft. Means is further provided on the aircraft for detecting the variations in the electromagnetic field whereby the exact velocity of the aircraft relative to the variable field and the actual "ground-speed" thereof may be accurately determined. In accordance with a further feature of the invention, the variations or maximal points of the electromagnetic field are uniformly spaced and are so close together, for example from 5 to 100 meters, as to be successively traversed or intercepted quite rapidly at the usual velocities of aircraft. This results in a simplification of the detecting or indicating apparatus upon the aircraft as will be pointed out hereinafter.

For a better understanding of the underlying principles of the invention, and of further objects and advantages thereof, reference should be had to the embodiments thereof illustrated on the accompanying drawings, wherein Fig. 1 is a diagram illustrating the underlying principles of the invention;

Fig. 2 is a diagrammatic view of one form of radiant-energy transmitting apparatus which may be employed to produce the variable electromagnetic field shown in Fig. 1;

Figs. 3 and 4 are views illustrating the receiving apparatus that may be employed for detecting the variations of the electromagnetic field and thereby measuring or determining the velocity of the aircraft with reference to the field and to the ground or other reference point; and Figs. 5, 6 and 7 are diagrammatic views of modified forms of radiant-energy transmitting apparatus in accordance with the invention.

While the present invention is capable of many applications or uses, as pointed out above the most important use is believed to be for the purpose of determining or measuring actual "ground-speed" of aircraft. Hence this particular application of the invention will be described in detail in order to explain the fundamental principles thereof and to bring out its advantages without limiting the same to such use. Thus, in Fig. 1, the surface of the ground or water along the line of flight of aircraft is indicated at I. A non-uniform electromagnetic field 2, preferably stationary or substantially stationary, is shown having cyclic and preferably uniformly spaced maximal points 3 which are in reality planes substantially perpendicular to the line of flight of aircraft 4. Variations in the intensity of the field are represented by vertical lines. The maximal points or planes 3 are preferably though not necessarily spaced apart a distance of the order of 5 to 100 meters so that the aircraft under normal conditions will traverse or intercept said points in comparatively rapid succession. It will be apparent that if the field 2 is stationary, the time interval required for the aircraft to pass from one maximal point to the next is directly proportional to the actual "ground speed" of the aircraft if the line of flight is perpendicular to the said planes. If the line of flight is at a known angle thereto, or the electromagnetic field is moving at a known velocity not substantially greater than a velocity of the same order of magnitude as the velocity of the aircraft, the actual "ground speed" may be accurately determined by applying simple correction factors.

In accordance with the preferred form of the invention, the field 2 is produced by interference between two radio or radiant-energy transmitters 5 and 6, as shown in Fig. 2, which may be connected to the ground 7 and provided with suitable radiating antennae in accordance with usual practice. The transmitters 5 and 6 are located at widely spaced points, for example, at the ends of the channel or airplane route between two principal terminal cities, and radiate approximately equal amounts of energy at the same frequency to produce a stationary interference field of non-uniform intensity as shown in Fig. 1 between the transmitters. Additional transmitters may also be provided substantially in alinement with the two stations illustrated. If the transmitters 5 and 6 differ slightly in frequency, the electromagnetic field which is the resultant of both transmitters, will have relative movement which is considered objectionable to some extent although allowance can be made therefor if it is desired to utilize differing frequencies. In other words, while different frequencies may be employed, the method is simplified by the utilization of equal frequencies.

The formation of a stationary interference pattern produced by two radiant-energy transmitters is shown for example in French Patent #577,629, but the spacing of the transmitters is so close that the resultant field is only adapted for directional indication and the system neither embodies nor is adapted to be used in connection with speed-indicating apparatus. Suitable apparatus for this purpose is shown in Figs. 3 and 4.

Referring to Fig. 3, a collector 10, such as a loop antenna or coil may be provided upon the aircraft 4. The energy received thereby is amplified by an amplifier 11, such as a multi-stage vacuum tube amplifier similar to those employed in ordinary radio receivers, the output circuit of which includes a lamp or glow-discharge device 12. It will be apparent that if the receiver is tuned to the frequency of the transmitters 5 and 6, amplification of the energy received to such an extent as to affect the lamp 12 will result in a flickering of said lamp at a rate dependent upon the relative velocity of the aircraft and the electromagnetic field 2. If the waves emitted are of the order of from 5 to 100 meters, the indications produced by the lamp will be of such frequency as to be visible to the pilot at ordinary velocities.

If desired, the signals radiated by one or both transmitters may be modulated by an audible frequency which may be detected by the use of telephone receivers in place of the lamp 12; or an electrical indicating instrument may be employed to indicate velocity directly. The latter arrangement is shown in Fig. 4, wherein a collector 15 is connected through an amplifier 16 to a relay 17. The relay 17 is shown as of the magnetic type provided with an armature 18 but a discharge tube relay, for example, of the arc-discharge type may be used. The relay 17 is adapted to control a highly damped alternating-current voltmeter or ammeter 19 by charging and discharging a condenser 20 therethrough. A battery 21 is provided for charging the condenser. The indication of the instrument 19 is proportional to the rate of operation of the relay 17 and consequently the instrument may be calibrated in terms of velocity to provide a direct and accurate indication of the true "ground-speed" of the aircraft upon which the amplifier is located.

The non-uniform electromagnetic field 2 may also be produced in other ways, as for example by means of a series of radiant-energy transmitters 22 (see Fig. 5) closely spaced along the line of flight of the aircraft. The transmitters 22 are shown as provided with antennae 23. The transmitters 22 are of limited capacity or range and are operative to control the speed-indicating apparatus upon aircraft as the craft reaches the proximity of each station. Directive antennae may be employed of the usual character to prevent undesired overlapping of the radiation from the transmitters. The transmitters may all be of approximately the same frequency and are adapted to be simultaneously energized. However, the system need not be continuously energized and a relay circuit 24 is shown containing a relay 25 in each station operative to render the stations operative or inoperative when desired depending upon the position of a controlling switch 26.

Further, as shown in Figs. 6 and 7, in accordance with the invention, a series of stations 32 provided with antennae 33 and 34 may be arranged along the line of flight and may be successively energized in such a manner as to propagate a disturbance along the channel at a predetermined rate, for example, at a velocity slightly greater than the maximum velocity of the aircraft. Then the rate of decay of the signals provides an indication of the "ground-speed" of the aircraft. The receiving apparatus upon the aircraft which is employed in connection with the systems of Figs. 5 to 7 may be similar to that described in connection with Figs. 1 to 4.

The arrangement shown in Figs. 6 and 7 is shown and claimed in my prior application Ser. No. 438,561 filed March 24, 1930 of which the present application is a continuation in part. The closure of a switch 35 at one end of the channel releases a latch 36 controlling time-switching mechanism 37 and 38 driven by a motor 39 to send out signals from the first station and subsequently, for example after three seconds, to release the time-controlling mechanism at the second station over the circuit 40. The stations may be arranged from ¼ to ½ mile apart, if desired. The use of directive antennae 33 and 34, sending out separate signals of maximum strength along the channel and transverse thereto, permits the pilot or listener to make allowances for varying transmission conditions in interpreting the rate of decay of the signals in terms of "ground-speed" as it is well known that the strength of signals received from remote transmitters is affected by sunlight, weather conditions and other factors.

Various modifications of the specific arrangements shown and described will occur to those skilled in the art and are intended to be included within the scope of the invention as defined by the appended claims.

I claim:

1. In a ground speed indicating system for aircraft, a plurality of spaced radio transmitters of substantially the same frequency located along the line of flight of aircraft and producing a non-uniform electromagnetic field between the transmitters; a craft-carried radio frequency receiver tuned to the frequency of said transmitters; a radio frequency amplifier included in said receiver; and a visual speed indicating device directly connected to the output of said amplifier and operated by the beat radio frequency currents received on said craft as it moves through said field.

2. In a ground speed indicating system for aircraft, a plurality of spaced radio transmitters of substantially the same frequency located along the line of flight of aircraft and producing a non-uniform electromagnetic field between the transmitters; a craft-carried radio frequency receiver tuned to the frequency of said transmitters; a radio frequency amplifier included in said receiver; and a luminous speed indicator directly connected to the output of said amplifier and operated by the beat radio frequency currents received on said craft as it moves through said field.

3. In a speed indicating system for aircraft and the like, two widely spaced radiant-energy transmitters of substantially the same frequency located along the line of flight of aircraft and producing a non-uniform electromagnetic field between them; a craft-carried radio frequency receiver having a single tuned collector circuit tuned to the frequency of said transmitters; a radio frequency amplifier included in said receiver; and an electroresponsive indicating device directly connected to the output of said amplifier to be operated directly by the beat radio frequency currents received in said receiver on said craft as it moves through said field and to indicate the ground speed of the craft.

4. In a ground speed indicating system for aircraft, a plurality of spaced radio transmitters of substantially the same frequency located along the line of flight of aircraft and producing a non-uniform electromagnetic field between the transmitters; a craft-carried radio frequency receiver tuned to the frequency of said transmitters; a radio frequency amplifier included in said receiver; and an electroresponsive device directly connected to the output of said amplifier and operated by the beat radio frequency currents received on said craft as it moves through said field.

5. In a ground speed indicating system for aircraft, a plurality of spaced radio transmitters of substantially the same frequency located along the line of flight of aircraft and producing a non-uniform electromagnetic field between the transmitters, said field being characterized by the presence of nodes and loops representing areas of low and high field strength, respectively; a craft-carried radio frequency receiver having a single tuned collector circuit responsive to a single resonant frequency corresponding to the frequency of said transmitters; and an electroresponsive indicating device connected to the output of said receiver to be operated by the variable energy input to said receiver on said craft as it moves through said non-uniform field, said indicating device being constructed and arranged to indicate the ground speed of the craft.

6. In a ground speed indicating system for aircraft, a plurality of spaced radio transmitters operating in synchronism and transmitting waves of the same frequency along the line of flight of aircraft, said transmitters producing a non-uniform electromagnetic field between them and characterized by an interference pattern made up of regions of alternate high and low field strength; a craft-carried radio frequency receiver having a single collector circuit tuned to respond to a single resonant frequency corresponding to the frequency of said transmitters; and an electroresponsive indicating device connected to the output of said receiver and to be operated by the beat radio frequency currents received in said receiver on said craft as it moves through said regions of non-uniform magnetic field strength, said device being constructed and arranged to indicate the ground speed of the craft.

EARL R. EVANS.